(12) United States Patent
Hori (10) Patent No.: US 8,649,247 B2
(45) Date of Patent: Feb. 11, 2014

(54) OPTICAL DISC APPARATUS AND OPTICAL POWER CONTROL METHOD

(71) Applicant: Funai Electric Co., Ltd., Osaka (JP)

(72) Inventor: Shinya Hori, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/677,718

(22) Filed: Nov. 15, 2012

(65) Prior Publication Data

US 2013/0163401 A1 Jun. 27, 2013

(30) Foreign Application Priority Data

Dec. 26, 2011 (JP) ................................. 2011-282860

(51) Int. Cl.
*G11B 7/00* (2006.01)
(52) U.S. Cl.
USPC ....................................... 369/53.26
(58) Field of Classification Search
None
See application file for complete search history.

(56) References Cited

U.S. PATENT DOCUMENTS

| 5,274,622 | A | * | 12/1993 | Kono | 369/116 |
| 5,526,333 | A | * | 6/1996 | Usui et al. | 369/47.51 |
| 5,544,136 | A | * | 8/1996 | Horie | 369/44.34 |
| 7,310,293 | B2 | * | 12/2007 | Senga et al. | 369/47.53 |
| 8,027,236 | B2 | * | 9/2011 | Nabeta | 369/53.37 |
| 2002/0021641 | A1 | * | 2/2002 | Miyabata et al. | 369/53.26 |
| 2003/0016426 | A1 |  | 1/2003 | Seong et al. | |
| 2003/0156514 | A1 | * | 8/2003 | Suzuki | 369/47.53 |
| 2004/0037192 | A1 | * | 2/2004 | Suzuki | 369/47.53 |
| 2004/0037198 | A1 | * | 2/2004 | Sasaki et al. | 369/53.26 |
| 2004/0081050 | A1 |  | 4/2004 | Yamamoto | |
| 2004/0228250 | A1 | * | 11/2004 | Ishitobi et al. | 369/53.37 |
| 2006/0006312 | A1 |  | 1/2006 | Kiji | |
| 2006/0193225 | A1 | * | 8/2006 | Kon et al. | 369/53.45 |
| 2007/0171805 | A1 | * | 7/2007 | Shigeta et al. | 369/116 |
| 2008/0056086 | A1 |  | 3/2008 | Kuroda | |

FOREIGN PATENT DOCUMENTS

JP 2008-117488 5/2008

OTHER PUBLICATIONS

Extended European Search report dated Apr. 8, 2013 for corresponding International application No. 12193130.7.

* cited by examiner

*Primary Examiner* — Peter Vincent Agustin
(74) *Attorney, Agent, or Firm* — Morgan, Lewis & Bockius LLP (57) ABSTRACT

An optical disc apparatus includes: a light source; a power detection portion that detects optical power of light emitted from the light source; a temperature detection portion that detects an ambient temperature of the power detection portion; a storage portion in which information relating to a temperature drift characteristic of the power detection portion is stored; and a control portion that controls the optical power while performing a temperature correction relating to the power detection portion by using the information stored in the storage portion. In the optical disc apparatus, the information stored in the storage portion is updated.

5 Claims, 6 Drawing Sheets

OPTICAL DISC APPARATUS AND OPTICAL POWER CONTROL METHOD

This application is based on Japanese Patent Application No. 2011-282860 filed on Dec. 26, 2011, the contents of which are hereby incorporated by reference.

BACKGROUND OF THE INVENTION

1. Field of the Invention

The present invention relates to an optical disc apparatus and an optical power control method, and relates particularly to a technique for controlling optical power, which suppresses an influence of a phenomenon that an output of a power detection portion that detects optical power varies with a change in environmental temperature.

2. Description of Related Art

Conventionally, an optical disk apparatus has been used to reproduce information recorded on an optical disc and/or to record information on an optical disk. In such an optical disc apparatus, in order to achieve stable quality in reproduction and/or recording, generally, reproduction and/or recording with respect to an optical disk are performed while optical power of light being used to irradiate the optical disk is controlled.

That is, an optical disk apparatus is provided with a power detection portion (front monitor detector (FMD)) that detects optical power of light emitted from a light source. In the optical disk apparatus, reproduction and/or recording with respect to an optical disc are performed while feedback control (APC (auto power control)) is performed so that optical power (intensity) of light detected by the power detection portion attains a predetermined value.

JP-A-2008-117488 discloses a technique for performing APC in which a correction in consideration of temperature characteristics of an optical component and an electronic component is made so that irradiation power can be controlled with high accuracy. It is disclosed therein that, in order to correct a variation in detection sensitivity of an FMD with a temperature change, a sensitivity coefficient of the FMD is changed depending on a temperature change, and based on a result of detection by the FMD, a target power value of an APC circuit is calculated.

SUMMARY OF THE INVENTION

An output value (voltage) outputted from the power detection portion varies with a change in temperature (an ambient temperature of the power detection portion). This leads to a fear that, in a case where a temperature change occurs, even though APC is being performed, power of light being used to irradiate an optical disc might vary, resulting in variations in recording or reproduction quality. That is, it is desired to suppress an influence of a phenomenon that an output value outputted from the power detection portion varies with a temperature change thereby to reduce a variation in power of light used to irradiate an optical disc.

Furthermore, for example, it is also possible that a temperature characteristic of the power detection portion might vary over time during use of the optical disc apparatus. In such a case, simply making a correction by using pre-stored data might not be enough to achieve a proper correction. It is, therefore, desired to properly correct an influence due to a temperature change in consideration also of such a variation with time in temperature characteristic thereby to reduce a variation in power of light used to irradiate an optical disc.

With the foregoing in mind, it is an object of the present invention to provide an optical disc apparatus and an optical power control method that appropriately suppress an influence due to a change in environmental temperature and thus can appropriately control optical power.

In order to achieve the above-described object, an optical power control method of the present invention is a method in which a power detection portion that detects optical power of light emitted from a light source is used to control the optical power. The optical power control method has a configuration (first configuration) including: a first step of acquiring a temperature drift characteristic of the power detection portion by acquiring an output value of the power detection portion at each of two or more timings at which an ambient temperature of the power detection portion has different values from each other; a second step of, based on the temperature drift characteristic, determining whether or not a gain of the power detection portion should be changed; a third step of, if the gain is determined not to be changed, determining to perform a temperature correction relating to the power detection portion based on the temperature drift characteristic previously acquired and, if the gain is determined to be changed, determining to newly acquire a temperature drift characteristic and perform the temperature correction relating to the power detection portion based on the newly acquired temperature drift characteristic; and a fourth step of performing the control of the optical power while performing the temperature correction based on the temperature drift characteristic determined to be used for the temperature correction and on a measured ambient temperature of the power detection portion. In the first step, in acquiring an output of the power detection portion, the light source may be used in a non-light emitting state.

According to this configuration, optical power control is performed in a state where a gain of the power detection portion is set appropriately. Furthermore, according to this configuration, optical power control is performed while a temperature correction relating to the power detection portion (which is intended to perform not only a correction of an output value from the power detection portion but also a correction of a target value of optical power control) is appropriately performed so as to correspond to a change in ambient temperature of the power detection portion. That is, according to this configuration, an influence due to a change in environmental temperature is appropriately suppressed, and thus optical power can be appropriately controlled.

In the above-described optical power control method of the first configuration, there may be adopted a configuration (second configuration) in which temperature correction information obtained based on the temperature drift characteristic used for the temperature correction is store in a storage portion.

In the above-described optical power control method of the first or second configuration, there may be adopted a configuration (third configuration) in which the first to third steps are performed at the time of assembling an apparatus including the power detection portion, and the fourth step is executed in the apparatus after having been assembled.

In the above-described optical power control method of any one of the first to third configurations, there may be adopted a configuration (fourth configuration) in which in acquiring the temperature drift characteristic, the light source is made to emit light to cause a change in ambient temperature of the power detection portion.

In order to achieve the above-described object, an optical disc apparatus of the present invention has a configuration (fifth configuration) including: a light source; a power detection portion that detects optical power of light emitted from the light source; a temperature detection portion that detects an ambient temperature of the power detection portion; a storage portion in which information relating to a temperature drift characteristic of the power detection portion is stored; and a control portion that controls the optical power while performing a temperature correction relating to the power detection portion by using the information stored in the storage portion. In the optical disc apparatus, the information stored in the storage portion is updated.

According to this configuration, even in a case where there occurs a variation in temperature drift characteristic of the power detection portion due to, for example, long time use of the apparatus or the like, an influence due to a change in environmental temperature is appropriately suppressed, and thus optical power of light used to irradiate an optical disc can be appropriately controlled.

In the above-described optical disc apparatus of the fifth configuration, there may be adopted a configuration (sixth configuration) in which the control portion acquires a temperature drift characteristic of the power detection portion at a predetermined timing and, based on the temperature drift characteristic, updates the information stored in the storage portion.

In the above-described optical disc apparatus of the fifth or sixth configuration, there may be adopted a configuration (seventh configuration) in which the control portion acquires a temperature drift characteristic of the power detection portion at a predetermined timing and, based on the temperature drift characteristic, determines whether or not a gain of the power detection portion should be changed. In this configuration, if the gain is determined to be changed, by using a post-change gain, the control portion newly acquires a temperature drift characteristic and, based on the newly acquired temperature drift characteristic, updates the information stored in the storage portion.

According to the present invention, an optical disc apparatus and an optical power control method can be provided that appropriately suppress an influence due to a change in environmental temperature and thus can appropriately control optical power.

DETAILED DESCRIPTION OF PREFERRED EMBODIMENTS

Hereinafter, embodiments of the optical disc apparatus and the optical power control method of the present invention will be described in detail with reference to the appended drawings.

(First Embodiment)

Figure 1:
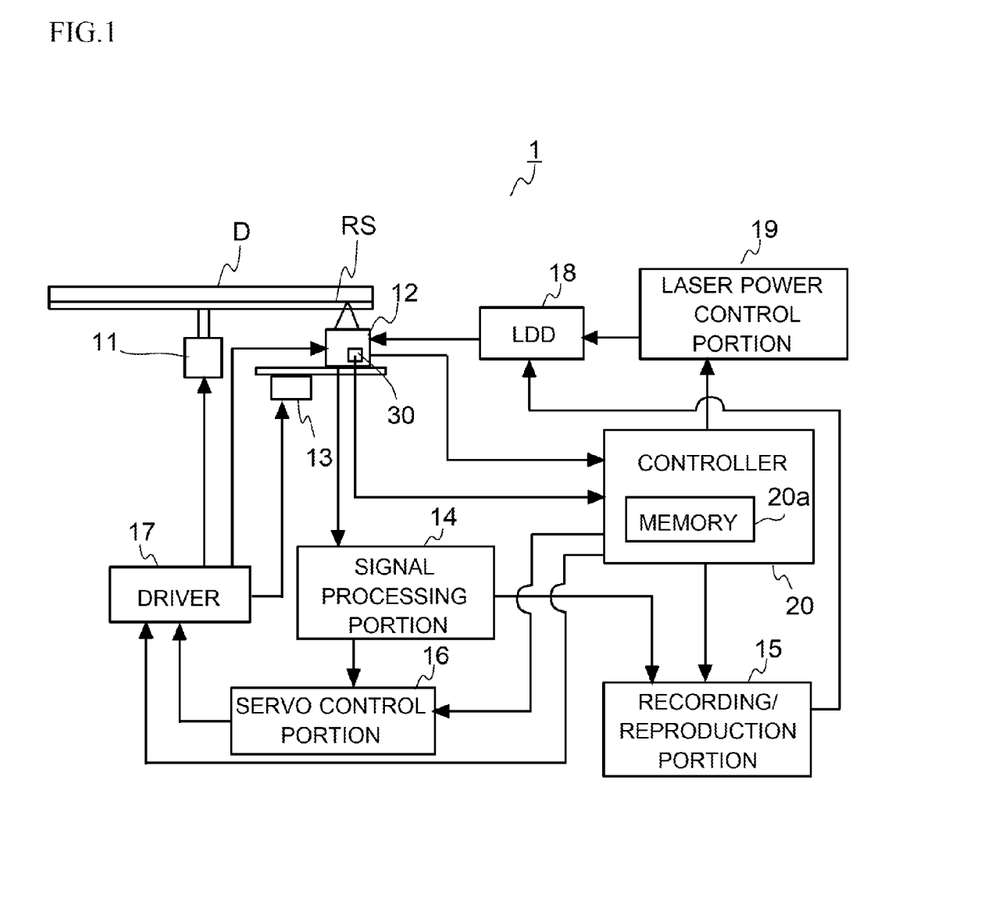
FIG. 1 is a block diagram showing a configuration of an optical disc apparatus according to a first embodiment.

FIG. 1 is a block diagram showing a configuration of an optical disc apparatus 1 according to a first embodiment. In FIG. 1, an optical disc D is also shown for easier understanding. As shown in FIG. 1, the optical disc apparatus 1 includes a spindle motor 11. The spindle motor 11 is connected at its output shaft to a turntable (not shown) that demountably holds the optical disc D. Thus, driving the spindle motor 11 allows the optical disc D held by the turntable to be rotated.

Figure 2:
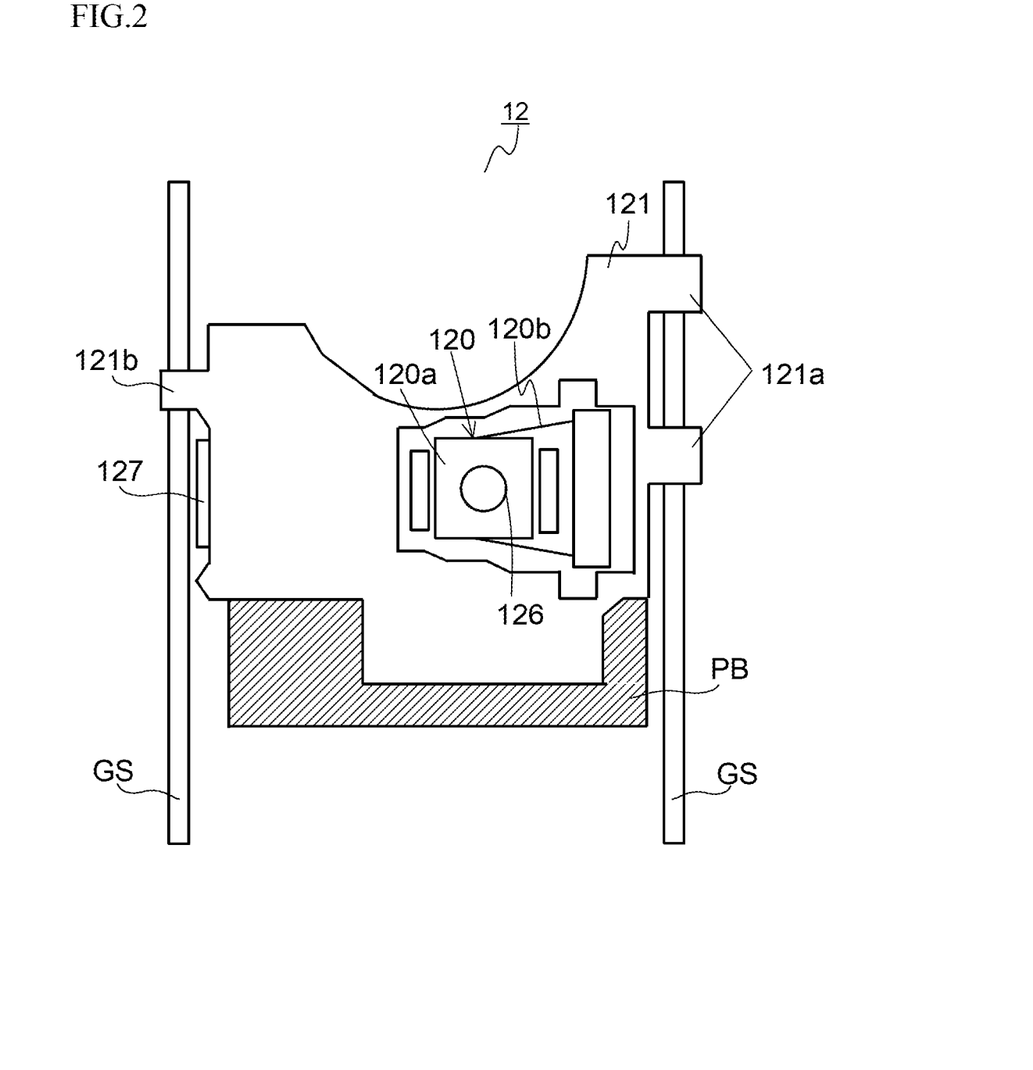
FIG. 2 is a schematic plan view showing an external configuration of an optical pickup included in the optical disc apparatus according to the first embodiment.
Figure 3:
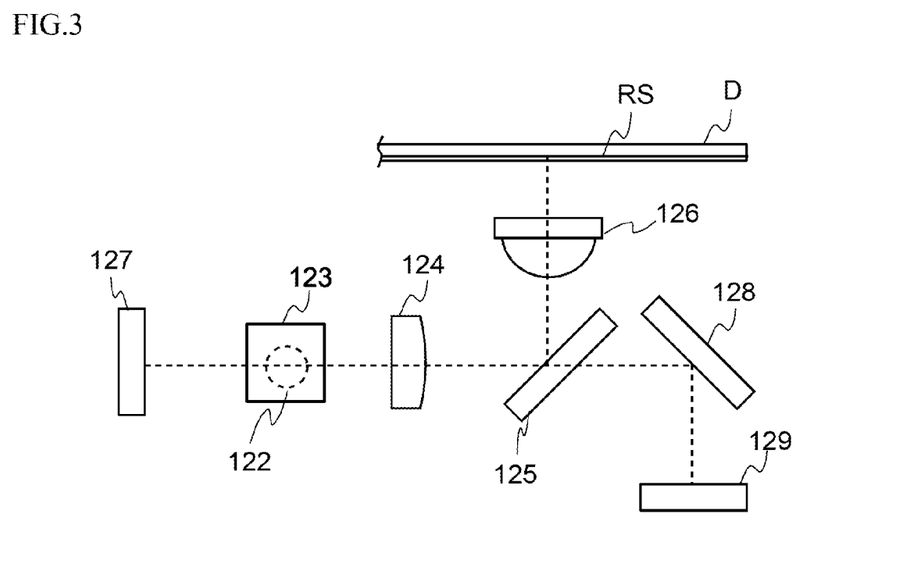
FIG. 3 is a schematic plan view for explaining an optical configuration of the optical pickup included in the optical disc apparatus according to the first embodiment.

The optical disc apparatus 1 includes an optical pickup 12 that irradiates the optical disc D with light and receives light reflected off the optical disc D. The optical pickup 12 is a device for reading information recorded on the optical disc D and for writing information on the optical disc D. With reference to FIGS. 2 and 3, the following describes in detail a configuration of the optical pickup 12.

FIG. 2 is a schematic plan view showing an external configuration of the optical pickup 12 included in the optical disc apparatus 1 according to the first embodiment. In FIG. 2, when the optical pickup 12 shown therein is used to read information from the optical disc D and/or to write information on the optical disc D, the optical disc D is disposed on the front side of the plane of this figure. Furthermore, FIG. 3 is a schematic plan view for explaining an optical configuration of the optical pickup 12 included in the optical disc apparatus 1 according to the first embodiment. In FIG. 3, part of the optical disc D is also shown for easier understanding.

The optical pickup 12 has a base 121 on which various members required for reading and writing information are mounted. The base 121 is slidably supported, by use of bearings 121a and 121b provided at lateral ends thereof, on two guide shafts GS disposed in the optical disc apparatus 1. The two guide shafts GS are disposed parallel to a direction of the radius (radial direction) of the optical disc D.

In this embodiment, the base 121 is moved by use of a thread motor 13 (see FIG. 1). For example, a configuration is adopted in which the thread motor 13 is driven to rotate a lead screw (not shown). Further, a configuration is adopted in which, by use of a conversion mechanism (not shown; for example, a mechanism using teeth or a nut member) that converts the rotation of the lead screw into a linear movement, the base 121 is moved in the radial direction. By moving the base 121 in the radial direction, it becomes possible for the optical pickup 12 to access a desired address on the optical disc D being rotated.

As shown in FIG. 3, the various members mounted on the base 121 include a semiconductor laser 122 (one example of the light source of the present invention), a first beam splitter 123, a collimator lens 124, a second beam splitter 125, an objective lens 126, a photodetector 127, a mirror 128, and a power detector 129 (one example of the power detection portion of the present invention). In FIG. 3, the semiconductor laser 122 is drawn by a broken line to show that semiconductor laser 122 is located on the front side of the plane of this figure.

Light emitted from the semiconductor laser 122 is totally or partially reflected off the first beam splitter 123 to be transmitted through the collimator lens 124. Light that has been transmitted through the collimator lens 124 is partially reflected off the second beam splitter 125 to be sent to the objective lens 126. The objective lens 126 focuses light that has been reflected off the second beam splitter 125 onto an information recording surface RS of the optical disc D.

Returning light reflected off the optical disc D is transmitted through the objective lens 126 and then is reflected off the second beam splitter 125. After that, the returning light is transmitted sequentially through the collimator lens 124 and the first beam splitter 123 to reach the photodetector 127. The photodetector 127 photoelectrically converts the light that has entered it and outputs a result of the conversion to a signal processing portion 14 (see FIG. 1).

Light that has entered the second beam splitter 125 from the collimator lens 124 is partially transmitted through the second beam splitter 125. Light that has been transmitted through the second beam splitter 125 is reflected by the mirror 128 to reach the power detector 129. The power detector 129 is disposed for the purpose of detecting optical power (laser power) of light emitted from the semiconductor laser 122 and functions as a so-called detector for a front monitor. The power detector 129 is disposed on a circuit board PB mounted to the base 121 (mounted to the rear surface side in FIG. 2). At a position on the circuit board PB on the periphery of the power detector 129, a thermistor 30 (see FIG. 1; one example of the temperature detection portion of the present invention) is disposed.

The objective lens 126 is mounted on an actuator 120 (see FIG. 2) mounted so as to be embedded in the base 121 and is configured to be movable in a focus direction (a direction in which the objective lens 126 approaches and separates from the optical disc D; a direction perpendicular to the plane of FIG. 2) and in a tracking direction (a direction parallel to the radial direction; a vertical direction in FIG. 2).

The actuator 120 has a configuration including a lens holder 120a for holding the objective lens 126, which is swingably supported through the use of a wire 120b. The lens holder 120a (namely, the objective lens 126) is actuated by a force generated by use of a coil and a magnet. This type of actuator is known, and a detailed description of a configuration thereof, therefore, is omitted herein.

Referring back to FIG. 1, the signal processing portion 14 arithmetically processes an electric signal outputted from the photodetector 127 (see FIGS. 2 and 3) and thereby generates a reproduction RF signal, a focus error (FE) signal, a tracking error (TE) signal, or the like.

A recording/reproduction portion 15 includes a decoder and an encoder. The recording/reproduction portion 15 decodes a reproduction RF signal outputted from the signal processing portion 14 thereby to extract reproduction data and outputs the reproduction data to the exterior via an interface (not shown). Furthermore, the recording/reproduction portion 15 encodes data inputted from the exterior via the interface and converts it into a recording signal.

A servo control portion 16 generates a focus drive signal based on an FE signal and a tracking drive signal based on a TE signal. The focus drive signal and the tracking drive signal, which are thus generated, are outputted to a driver 17. Based on these signals, the driver 17 drives the actuator 120 (see FIG. 2). Moreover, based on commands from a controller 20 and from the servo control portion 16, the driver 17 drives the spindle motor 11 and the thread motor 13.

An LDD (laser diode driver) 18 supplies a drive signal for laser light emission to the semiconductor laser 122 (see FIG. 3) of the optical pickup 12. A laser power control portion 19 sends to the LDD 18 a control signal such that optical power (laser power) of light emitted from the semiconductor laser 122 in accordance with a command from the controller 20 attains a target value. The laser power control portion 19 functions as a so-called APC drive circuit.

The controller 20 (one example of the control portion of the present invention) is constituted by, for example, a microcomputer and executes, as appropriate, control processing depending on an operation to be executed by each of various constituent components of the optical disc apparatus 1 and arithmetic processing required for the control. The controller 20 includes a memory 20a including a ROM (read only memory) and a RAM (random access memory). The ROM stores therein various parameters and operational programs required for the controller 20 to perform various kinds of processing. The RAM is used as a work region and also as a storage region for storing various kinds of information.

An output value from the power detector 129 (see FIG. 3) of the optical pickup 12 is inputted to the controller 20. Furthermore, temperature information detected by the thermistor 30 disposed on the circuit board PB (see FIG. 2) of the optical pickup 12 also is inputted to the controller 20. Based on output information on the power detector 129 and the temperature information, which are thus inputted, the controller 20 issues a command to the laser power control portion 19.

Figure 4:
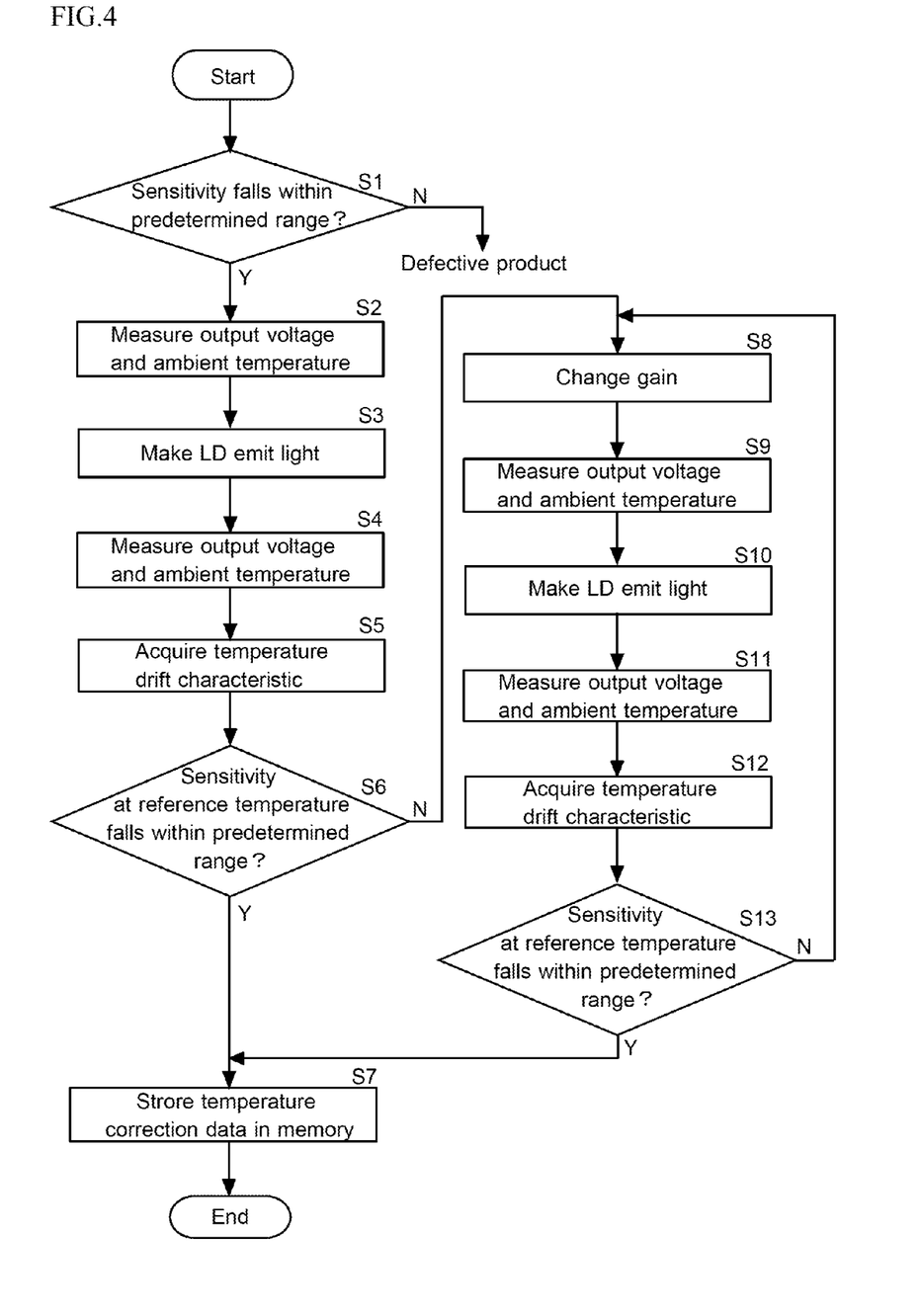
FIG. 4 is a flow chart showing an adjustment flow relating to a power detector included in the optical disc apparatus according to the first embodiment.

Next, with reference to FIG. 4, a description is given of an adjustment for performing a temperature correction relating to the power detector 129 in the optical disc apparatus 1 configured as above. FIG. 4 is a flow chart showing an adjustment flow relating to the power detector 129 included in the optical disc apparatus 1 according to the first embodiment. The adjustment flow shown in FIG. 4 is performed at the time of assembling the optical disc apparatus 1 and is included in an optical power control method (a method for controlling optical power, which suppresses an influence due to a temperature characteristic of the power detector 129) executed by the optical disc apparatus 1.

In performing the adjustment relating to the power detector 129, first, it is checked whether or not the power detector 129 has a sensitivity falling within a preset range (performance range) (Step S1). A sensitivity as described herein refers to a ratio of an amount of an output voltage to an amount of input light. A predetermined amount of light is made to enter the power detector 129, and it is checked whether or not a sensitivity falling within a predetermined range can be obtained. If the power detector 129, after undergoing an adjustment in terms of a gain (an amplifier gain of the power detector 129), has a sensitivity deviating from the predetermined range (No at Step S1), such a power detector is regarded as a defective product and will not be used.

If the power detector 129 has a sensitivity falling within the predetermined range (Yes at Step S1), a voltage value outputted from the power detector 129 and an ambient temperature of the power detector 129 are measured (Step S2). At this time, the semiconductor laser (LD) 122 is in a non-light emitting state. Furthermore, the gain of the power detector 129 is set to a level used to obtain the sensitivity falling within the predetermined range at Step S1. In addition, the ambient temperature of the power detector 129 is measured by the thermistor 30 provided in the optical pickup 12.

Next, the semiconductor laser 122 is made to emit light for a predetermined length of time (Step S3). This is intended to make the ambient temperature of the power detector 129 vary. After the semiconductor laser 122 has been made to emit light for the predetermined length of time (after the semiconductor laser 122 is turned off), the voltage value outputted from the power detector 129 and the ambient temperature of the power detector 129 are measured (Step S4). In this case, the gain of the power detector 129 is set to the level used at Step S1. Furthermore, the ambient temperature of the power detector 129 is measured by the thermistor 30.

Based on results of the measurements at Step S2 and Step S4, a temperature drift characteristic (a relationship between a voltage value and a temperature) relating to the voltage value outputted from the power detector 129 is acquired (Step S5). By using the temperature drift characteristic thus acquired, a sensitivity of the power detector 129 at a reference temperature (for example, 25° C., etc.) is determined, and it is checked whether or not said sensitivity falls within the predetermined range (Step S6). In order to facilitate the determination of the sensitivity at the reference temperature, the ambient temperature of the power detector 129 may be measured in advance at Step S1 (at the time of acquiring the sensitivity). Furthermore, in order to determine the sensitivity at the reference temperature, a method may be adopted in which while the ambient temperature of the power detector 129 is measured, a predetermined amount of light is made to enter the power detector 129, and an output value (voltage value) from the power detector 129 is measured.

If the sensitivity at the reference temperature falls within the predetermined range (Yes at Step S6), it is determined that the power detector 129 is used with the gain used at Steps S2 and S4 and that, based on the temperature drift characteristic acquired at Step S5, the voltage value outputted from the power detector 129 is corrected. Then, based on the temperature drift characteristic thus determined to be used, a correction formula (or a correction table) with respect to the voltage value outputted from the power detector 129 is determined, and said temperature correction information (the correction formula or table) is stored in the memory 20a (more specifically, in the ROM) (Step S7).

If the sensitivity at the reference temperature falls outside the predetermined range (No at Step S6), the gain of the power detector 129 is changed (Step S8). By using a post-change gain, in a similar manner to the procedural steps from Step S2 to Step S6, Step S9 to Step S13 are performed. If, at Step S13, a sensitivity at the reference temperature falls within the predetermined range (Yes at Step S13), an advance is made to Step S7 where, based on a newly obtained temperature drift characteristic, a correction formula (or a correction table) with respect to a voltage value outputted from the power detector 129 is determined, and said temperature correction information (the correction formula or table) is stored in the memory 20a (more specifically, in the ROM).

On the other hand, if, at Step S13, the sensitivity at the reference temperature falls outside the predetermined range (No at Step S13), Step S8 and the steps subsequent thereto are repeatedly performed until a sensitivity at the reference temperature falling within the predetermined range is obtained.

Figure 5:
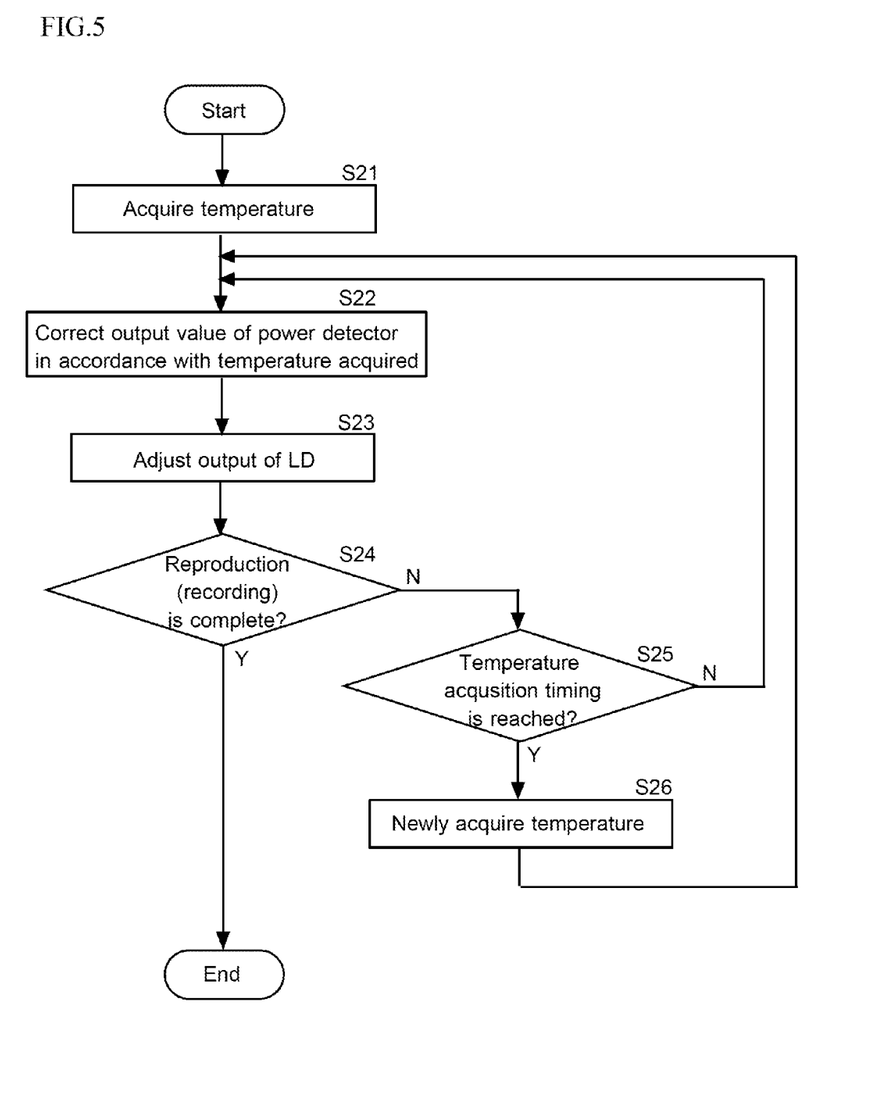
FIG. 5 is a flow chart showing a processing flow of APC executed in the optical disc apparatus according to the first embodiment.

Next, with reference to FIG. 5, a description is given of automatic power control (APC) of the optical disc apparatus 1 executed by using temperature correction information stored in the memory 20a as described above. FIG. 5 is a flow chart showing a processing flow of the APC executed in the optical disc apparatus 1 according to the first embodiment.

Upon receipt of a command to perform reproduction or recording, the controller 20 starts the APC. At the start of the APC, the controller 20 acquires a temperature (an ambient temperature of the power detector 129) from the thermistor 30 (Step S21). Then, based on temperature information thus acquired and temperature correction information stored in the memory 20a (the information stored in the memory 20a in the above-described adjustment flow relating to the power detector 129), the controller 20 corrects an output value (voltage value) outputted from the power detector 129 (Step S22).

In accordance with a command from the controller 20, the laser power control portion 19 compares a corrected voltage value with a target voltage value and, based on a result of the comparison, controls the LDD 18. As a result of this, the output of the semiconductor laser 122 (LD) is adjusted (Step S23). A target voltage value is, for example, determined as appropriate by the controller 20 upon receipt of a reproduction command or a recording command. If it is judged that the corrected voltage value is equal to the target voltage value, the output of the semiconductor laser 122 is maintained at a current level. If it is judged that the corrected voltage value deviates from the target voltage value, the output of the semiconductor laser 122 is changed from the current level depending on an amount of the deviation. A degree to which the output of the semiconductor laser 122 is changed could be determined, for example, in accordance with a formula obtained beforehand through an experiment or the like.

After the output of the LD has been adjusted, the controller 20 checks whether or not reproduction (or recording) is complete (Step S24). If the reproduction (or recording) is complete (Yes at Step S24), the controller 20 completes the APC. If the reproduction (or recording) is not complete (No at Step S24), the controller 20 checks whether or not a temperature acquisition timing is reached (Step S25). The temperature acquisition timing is set to be reached at, for example, every lapse of a preset given length of time or the like.

If it is judged that the temperature acquisition timing is reached, the controller 20 newly acquires a temperature (an ambient temperature of the power detector 129) from the thermistor 30 (Step S26). After the temperature has been newly acquired, a return is made to Step S22, and in accordance with newly acquired temperature information, Step S22 and the steps subsequent thereto are performed.

In the configuration of this embodiment, a gain of the power detector 129 is appropriately adjusted at the time of assembling the optical disc apparatus 1. Further, when APC is being executed, while an output value of the power detector 129 is corrected so as to correspond to a change in ambient temperature of the power detector 129, optical power of light emitted from the semiconductor laser 122 is controlled. Thus, in the optical disc apparatus 1 of this embodiment, an influence due to a change in environmental temperature is appropriately suppressed, and thus optical power of light used to irradiate the optical disc D can be appropriately controlled.

(Second Embodiment)

Next, a description is given of an optical disc apparatus of a second embodiment. The optical disc apparatus of the second embodiment has a configuration approximately similar to that of the optical disc apparatus 1 of the first embodiment. In describing the optical disc apparatus of the second embodiment, parts identical to those of the first embodiment are denoted by identical reference signs. The following description focuses on differences from the first embodiment.

Figure 6:
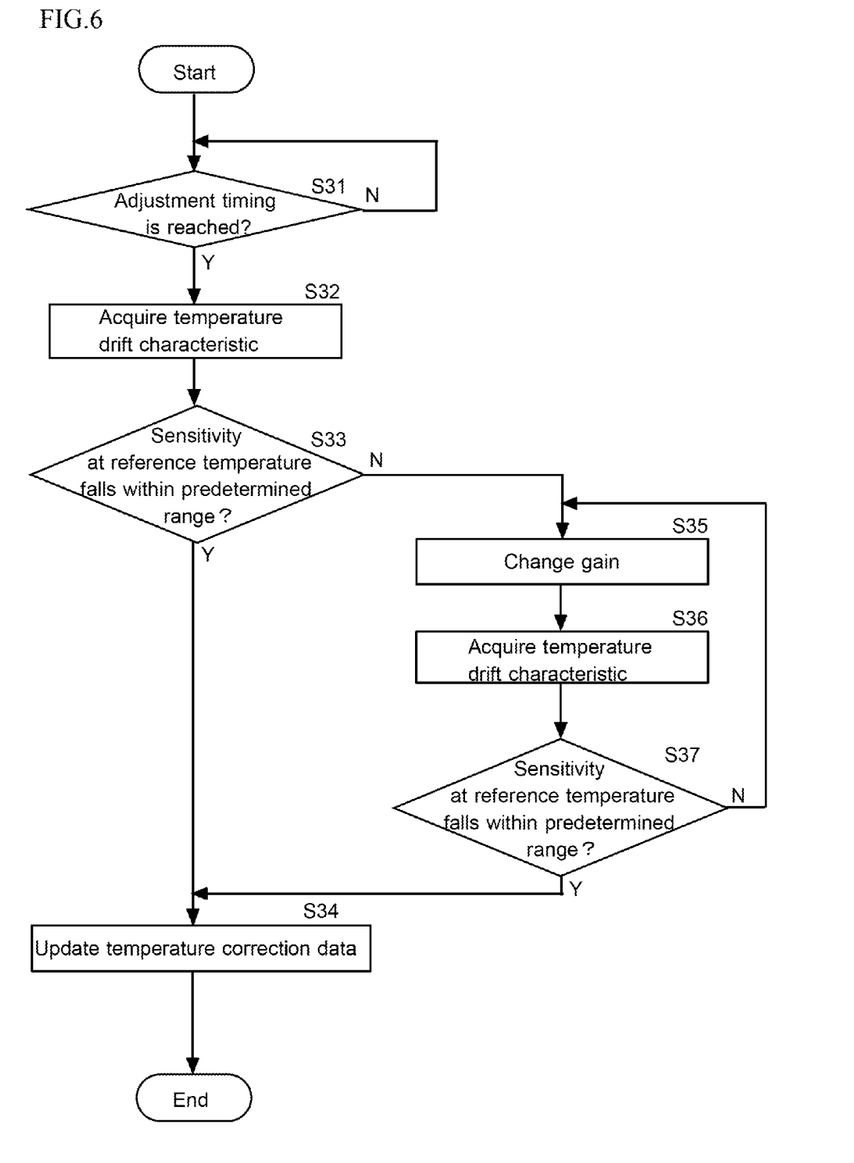
FIG. 6 is a flow chart showing a procedure of an adjustment relating to a power detector executed in an optical disc apparatus of a second embodiment.

An optical disc apparatus 1 of the second embodiment is characterized in that gain setting with respect to a power detector 129 and temperature correction information stored in a memory 20a are updated as appropriate. The following describes these points with reference to FIG. 6. FIG. 6 is a flow chart showing a procedure of an adjustment relating to the power detector 129 executed in the optical disc apparatus 1 of the second embodiment. An adjustment flow shown in FIG. 6 is designed to be executed in an optical disc apparatus after having been assembled.

A controller 20 checks whether or not a predetermined timing for executing the adjustment relating to the power detector 129 is reached (Step S31). As the predetermined timing, there are used various timings that are set to be reached, for example, at the time of power-on of the optical disc apparatus 1, at the time of power-off of the optical disc apparatus 1, in a case where a temperature detected at the time of power-on falls outside a predetermined range, before the start of reproduction or recording, at a lapse of a given length of time after the start of use, and so on.

If the controller 20 judges that the predetermined adjustment timing is reached, it acquires a temperature drift characteristic of an output value (voltage value) outputted from the power detector 129 (Step S32). Similarly to the adjustment flow (see FIG. 4) performed at the time of assembling the apparatus in the first embodiment, a temperature drift characteristic may be acquired by measuring a temperature (an ambient temperature of the power detector 129) and an output voltage (an output voltage of the power detector 129 at the time of no light emission) before and after light emission by a semiconductor laser 122. Furthermore, for example, a method may be adopted in which after completion of reproduction or recording, a temperature and an output voltage in a case where the semiconductor laser 122 is in a non-light emitting state are measured and pre-stored in the memory 20a, and based thereon and also on results of measuring, at a predetermined timing (for example, at the time of power-on), a temperature and an output voltage at the time of no light emission, a temperature drift characteristic is obtained.

After the acquisition of the temperature drift characteristic, by using the temperature drift characteristic thus acquired, the controller 20 determines a sensitivity of the power detector 129 at a reference temperature (for example, 25° C., etc.) and checks whether or not said sensitivity falls within a predetermined range (Step S33). In order that the sensitivity at the reference temperature can be determined by calculation, for example, a temperature drift characteristic and a sensitivity at the reference temperature determined at the time of assembling the apparatus may be pre-stored in the memory 20a. Furthermore, a method also may be adopted in which at the time of assembly, a relationship between a sensitivity and a gain is ascertained, and a relational formula therebetween is pre-stored in the memory 20a.

If the sensitivity at the reference temperature falls within the predetermined range (Yes at Step S33), based on the temperature drift characteristic acquired at Step S32, the controller 20 determines a correction formula (or a correction table) with respect to the voltage value outputted from the power detector 129. Then, the controller 20 updates temperature correction information (a correction formula or table) that has already been stored in the memory 20a to newly determined temperature correction information (Step S34). This completes the adjustment flow relating to the power detector 129.

On the other hand, if the sensitivity at the reference temperature falls outside the predetermined range (No at Step S33), the controller 20 changes a gain of the power detector 129 (Step S35). By using a post-change gain, the controller 20 acquires a temperature drift characteristic of the power detector 129 (Step S36). A temperature drift characteristic could be acquired by measuring a temperature (an ambient temperature of the power detector 129) and an output voltage (an output voltage of the power detector 129 at the time of no light emission) before and after light emission by the semiconductor laser 122.

If a sensitivity of the power detector 129 at the reference temperature, which is obtained based on the temperature drift characteristic thus acquired, falls within the predetermined range (Yes at Step S37), based on the newly obtained temperature drift characteristic, the controller 20 determines a correction formula (or a correction table) with respect to a voltage value outputted from the power detector 129. Then, the controller 20 updates temperature correction information (a correction formula or table) that has already been stored in the memory 20a to newly determined temperature correction information (Step S34).

On the other hand, if the sensitivity of the power detector 129 at the reference temperature, which is obtained based on the temperature drift characteristic thus acquired, falls outside the predetermined range (No at Step 37), the controller 20 repeatedly executes Step S35 and the steps subsequent thereto until a sensitivity at the reference temperature falling within the predetermined range is obtained.

Automatic power control (APC) using temperature correction information obtained in the above-described manner is similar to that performed in the first embodiment (see FIG. 5), and a description thereof, therefore, is omitted herein.

In this embodiment, gain setting with respect to the power detector 129 and temperature correction information (information used to correct an output value outputted from the power detector 129) stored in the memory 20a are updated as appropriate. Thus, in the optical disc apparatus 1 of this embodiment, an influence due to a change in environmental temperature is appropriately suppressed, and thus optical power of light used to irradiate an optical disc D can be appropriately controlled.

(Other Modifications and Variations)

The foregoing embodiments are only illustrative of the present invention, and the scope to which the present invention is applicable is not limited thereto.

For example, in the foregoing discussion, in order to suppress an influence due to a temperature drift characteristic of the power detector 129, an output value outputted from the power detector 129 is corrected. The present invention, however, is not intended to be limited thereto. That is, a configuration may be adopted in which, based on a temperature drift characteristic of the power detector 129, a target value of APC is changed, so that an influence due to the temperature drift characteristic is suppressed. Such a configuration also is encompassed by the "temperature correction relating to the power detection portion" of the present invention.

Furthermore, in the foregoing discussion, two temperature values are used to obtain a temperature drift characteristic. There is, however, no limitation thereto, and three or more temperature values may be used to obtain a temperature drift characteristic.

Furthermore, in the foregoing discussion, the optical disc apparatus includes one light source (semiconductor laser) and one objective lens. The respective numbers of these components used, however, may be changed as appropriate.

Furthermore, in each of the foregoing embodiments, the optical disc apparatus is configured to be capable of reproduction and recording. The present invention, however, is applicable also to an optical disc apparatus that performs only either one of reproduction and recording.

The present invention is applicable to, for example, a BD recorder, a DVD recorder, a BD player, a DVD player, and so on.

What is claimed is:

1. An optical power control method in which a power detection portion that detects optical power of light emitted from a light source is used to control the optical power, the method comprising:
   a first step of acquiring a temperature drift characteristic of the power detection portion by measuring an output value of the power detection portion;
   a second step of, based on the temperature drift characteristic acquired, checking whether or not a sensitivity of the power detection portion at a reference temperature falls within a predetermined range;
   a third step of, if the sensitivity falls within the predetermined range, determining to perform, without changing a gain of the power detection portion, a temperature correction relating to the power detection portion based on the temperature drift characteristic used for the checking of said sensitivity;

a fourth step of, if the sensitivity falls outside the predetermined range, changing the gain of the power detection portion and repeatedly performing the first step and the second step until the sensitivity falls within the predetermined range; and a fifth step of performing the control of the optical power while performing the temperature correction based on the temperature drift characteristic determined to be used for the temperature correction and on a measured ambient temperature of the power detection portion.

2. The optical power control method according to claim 1, wherein temperature correction information obtained based on the temperature drift characteristic used for the temperature correction is store in a storage portion.

3. The optical power control method according to claim 1, wherein the first to fourth steps are performed at a time of assembling an apparatus including the power detection portion, and the fifth step is executed in the apparatus after having been assembled.

4. The optical power control method according to claim 1, wherein in acquiring the temperature drift characteristic, the light source is made to emit light to cause a change in ambient temperature of the power detection portion.

5. An optical disc apparatus, comprising:

a light source;

a power detection portion that detects optical power of light emitted from the light source;

a temperature detection portion that detects an ambient temperature of the power detection portion;

a storage portion in which information relating to a temperature drift characteristic of the power detection portion is stored; and a control portion that controls the optical power while performing a temperature correction relating to the power detection portion by using the information stored in the storage portion, wherein, based on the temperature drift characteristic of the power detection portion acquired at a predetermined timing, the control portion checks a sensitivity of the power detection portion at a reference temperature to determine whether or not a gain of the power detection portion should be changed, and if the gain is determined to be changed, by using a post-change gain, the control portion newly acquires a temperature drift characteristic of the power detection portion and, based on the newly acquired temperature drift characteristic, updates the information stored in the storage portion.

\* \* \* \* \*